(12) United States Patent
Kohita et al.

(10) Patent No.: US 11,645,461 B2
(45) Date of Patent: May 9, 2023

(54) USER-CENTRIC OPTIMIZATION FOR INTERACTIVE DICTIONARY EXPANSION

(71) Applicant: INTERNATIONAL BUSINESS MACHINES CORPORATION, Armonk, NY (US)

(72) Inventors: Ryosuke Kohita, Edogawa-ku (JP); Issei Yoshida, Tokyo (JP); Hiroshi Kanayama, Kanagawa-ken (JP); Tetsuya Nasukawa, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 16/786,242

(22) Filed: Feb. 10, 2020

(65) Prior Publication Data

US 2021/0248315 A1 Aug. 12, 2021

(51) Int. Cl.
*G06F 16/35* (2019.01)
*G06F 40/242* (2020.01)
*G06F 16/36* (2019.01)

(52) U.S. Cl.
CPC .......... *G06F 40/242* (2020.01); *G06F 16/367* (2019.01)

(58) Field of Classification Search
CPC ........ G06F 40/30; G06F 16/285; G06F 17/18; G06F 16/24578; G06F 16/35; G06F 40/216; G06F 40/237; G06F 9/451
See application file for complete search history.

(56) References Cited

U.S. PATENT DOCUMENTS 8,180,630 B2   5/2012  Goud et al.
8,838,453 B2 * 9/2014  Satpute ............... G06F 3/04895
                                                       345/169

(Continued)

FOREIGN PATENT DOCUMENTS

CN         107390892         11/2017

OTHER PUBLICATIONS

Min et al, Fine-grained entity set refinement with user feedback, 2011, InProceedings of the RANLP 2011 Workshop on Information Extraction and Knowledge Acquisition Sep. 2011 (pp. 2-6).*

(Continued)

*Primary Examiner* — Olujimi A Adesanya
(74) *Attorney, Agent, or Firm* — Tutunjian & Bitetto, P.C.; Randy Emilio Tejeda

(57) ABSTRACT

A method is provided for dictionary expansion. The method acquires an object from a user and adds the object to a set of objects previously acquired from the user that form an expandable dictionary. The method calculates a centroid based on the set. The method calculates a similarity score of each of a plurality of objects relative to the centroid for each of a plurality of object features to calculate a weighted sum of similarity scores for each of the plurality of objects. The method presents candidate objects selected among the plurality of objects based on the weighted sum. The method acquires, from the user, a preferred candidate object among the candidate objects. The method updates weights of the plurality of features to maximize the weighed sum of similarity scores for the preferred candidate object. The method expands the dictionary by adding the preferred candidate object to the expandable dictionary.

20 Claims, 6 Drawing Sheets

(56) References Cited

U.S. PATENT DOCUMENTS

| | | | | |
|---|---|---|---|---|
| 8,868,592 | B1* | 10/2014 | Weininger | G06F 16/3322 |
| | | | | 707/767 |
| 8,880,526 | B2* | 11/2014 | Bhattacharya | G06F 16/35 |
| | | | | 707/737 |
| 10,410,242 | B1* | 9/2019 | Goel | G06Q 30/0256 |
| 10,467,307 | B1* | 11/2019 | Chanda | G06F 16/9535 |
| 2003/0074369 | A1* | 4/2003 | Schuetze | G06F 16/355 |
| 2005/0283725 | A1* | 12/2005 | Griffin | G06F 40/242 |
| | | | | 715/261 |
| 2010/0169361 | A1* | 7/2010 | Chen | G06F 16/285 |
| | | | | 707/769 |
| 2010/0198857 | A1* | 8/2010 | Metzler | G06Q 30/02 |
| | | | | 705/14.54 |
| 2014/0032584 | A1* | 1/2014 | Baker | G09G 5/14 |
| | | | | 715/765 |
| 2015/0019463 | A1* | 1/2015 | Simard | G06F 40/30 |
| | | | | 706/12 |
| 2015/0066939 | A1* | 3/2015 | Misra | G06F 16/355 |
| | | | | 707/739 |
| 2015/0100308 | A1* | 4/2015 | Bedrax-Weiss | G06F 40/242 |
| | | | | 704/10 |
| 2016/0210280 | A1 | 7/2016 | Tseng et al. | |
| 2016/0335706 | A1* | 11/2016 | Parikh | G06F 16/36 |
| 2018/0025303 | A1* | 1/2018 | Janz | G16H 50/20 |
| | | | | 705/2 |
| 2018/0121443 | A1* | 5/2018 | Bao | G06F 40/242 |
| 2020/0364298 | A1* | 11/2020 | Kohita | G06F 17/15 |

OTHER PUBLICATIONS

Alba et al, "Interactive Dictionary Expansion using Neural Language Models", 2018, InHumL@ ISWC2018 (pp. 7-15).*

Jindal et al, "Learning from negative examples in set-expansion", 2011, In2011 IEEE 11th International Conference on Data Mining Dec. 11, 2011 (pp. 1110-1115). IEEE.*

Mallapragada et al, "Active query selection for semi-supervised clustering", 2008, In 2008 19Th international conference on pattern recognition Dec. 8, 2008 (pp. 1-4). IEEE.*

Coden et al, "A method to accelerate human in the loop clustering", 2017, InProceedings of the 2017 SIAM International Conference on Data Mining Jun. 30, 2017 (pp. 237-245). Society for Industrial and Applied Mathematics.*

Vu et al, "Active learning for semi-supervised k-means clustering", 2010, In2010 22nd IEEE International Conference on Tools with Artificial Intelligence Oct. 27, 2010 (vol. 1, pp. 12-15). IEEE.*

Vyas et al, "Semi-automatic entity set refinement", 2009, InProceedings of Human Language Technologies: The 2009 Annual Conference of the North American Chapter of the Association for Computational Linguistics Jun. 2009 (pp. 290-298).*

Shen et al, "Setexpan: Corpus-based set expansion via context feature selection and rank ensemble", Sep. 2017, InJoint European Conference on Machine Learning and Knowledge Discovery in Databases Sep. 18, 2017 (pp. 288-304). Springer, Cham.*

Gyllensten et al. "Distributional term set expansion", Feb. 2018, arXiv preprint arXiv:1802.05014. Feb. 14, 2018., pp. 1-5.*

Anonymous et al., "System that uses Social Networking or Access Lists to Create & Share Specific Spell Check dictionaries", An IP.com Prior Art Database Technical Disclosure, IP.com No. IPCOM000216745D, Apr. 2012.

Shen et al., "SetExpan: Corpus-Based Set Expansion via Context Feature Selection and Rank Ensemble", In ECML/PKDD(1), Oct. 2017, pp. 288-304, vol. 10534 of Lecture Notes in Computer Science Springer.

Mell et al. "The NIST Definition of Cloud Computing", NIST Special Publication 800-145, 2011, 7 pages.

* cited by examiner

USER-CENTRIC OPTIMIZATION FOR INTERACTIVE DICTIONARY EXPANSION

BACKGROUND

The present invention generally relates to cognitive computing, and more particularly to a user-centric optimization for interactive dictionary expansion. Dictionaries are typically limited to the words they included at the time they are formed. Thus, there is a need for an interactive dictionary expansion.

SUMMARY

According to an aspect of the present invention, a computer-implemented method is provided for user-centric interactive dictionary expansion. The method includes acquiring, by a hardware processor, an object from a user and adding the object to a set of objects previously acquired from the user that form an expandable dictionary. The method further includes calculating a centroid based on the set of objects. The method also includes calculating a similarity score of each of a plurality of objects relative to the centroid for each of a plurality of object features to calculate a weighted sum of similarity scores for each of the plurality of objects. The method additionally includes presenting, using a display device, to the user a plurality of candidate objects selected among the plurality of objects based on the weighted sum of the similarity scores for each of the plurality of objects. The method further includes acquiring, from the user, a preferred candidate object among the plurality of candidate objects. The method also includes updating weights of the plurality of features to maximize the weighed sum of similarity scores for the preferred candidate object. The method additionally includes expanding the dictionary by adding the preferred candidate object to the expandable dictionary.

According to another aspect of the present invention, a computer program product is provided for user-centric interactive dictionary expansion. The computer program product includes a non-transitory computer readable storage medium having program instructions embodied therewith. The program instructions are executable by a computer to cause the computer to perform a method. The method includes acquiring, by a hardware processor of the computer, an object from a user and adding the object to a set of objects previously acquired from the user that form an expandable dictionary. The method further includes calculating a centroid based on the set of objects. The method also includes calculating a similarity score of each of a plurality of objects relative to the centroid for each of a plurality of object features to calculate a weighted sum of similarity scores for each of the plurality of objects. The method additionally includes presenting, using a display device, to the user a plurality of candidate objects selected among the plurality of objects based on the weighted sum of the similarity scores for each of the plurality of objects. The method also includes acquiring, from the user, a preferred candidate object among the plurality of candidate objects. The method additionally includes updating weights of the plurality of features to maximize the weighed sum of similarity scores for the preferred candidate object. The method further includes expanding the dictionary by adding the preferred candidate object to the expandable dictionary.

According to yet another aspect of the present invention, a computer processing system is provided for user-centric interactive dictionary expansion. The computer processing system includes a memory device including program code stored thereon. The computer processing system further includes a hardware processor, operatively coupled to the memory device, and configured to run the program code stored on the memory device to acquire an object from a user and adding the object to a set of objects previously acquired from the user that form an expandable dictionary. The hardware processor further runs the program code to calculate a centroid based on the set of objects. The hardware processor also runs the program code to calculate a similarity score of each of a plurality of objects relative to the centroid for each of a plurality of object features to calculate a weighted sum of similarity scores for each of the plurality of objects. The hardware processor additionally runs the program code to present, using a display device, to the user a plurality of candidate objects selected among the plurality of objects based on the weighted sum of the similarity scores for each of the plurality of objects. The hardware processor further runs the program code to acquire, from the user, a preferred candidate object among the plurality of candidate objects. The hardware processor also runs the program code to update weights of the plurality of features to maximize the weighed sum of similarity scores for the preferred candidate object. The hardware processor additionally runs the program code to expand the dictionary by adding the preferred candidate object to the expandable dictionary.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a user-centric optimization for interactive dictionary expansion.

In one or more embodiments, similarity is used to expand a user-centric dictionary where the similarity is determined from a centroid of a set of words (e.g., seed terms) to a plurality of words from which candidate words are selected for inclusion into the dictionary. In this way, the collective similarity of the set of words can be used as a measure against which to judge a candidate word for inclusion into the dictionary.

To aid in the preceding, the present invention uses a weight adjustment approach that maximizes a pair-wise similarity between the centroid of the set of words and each of the candidate words.

These and other features and aspects of the present invention are described in further detail hereinbelow.

Figure 1:
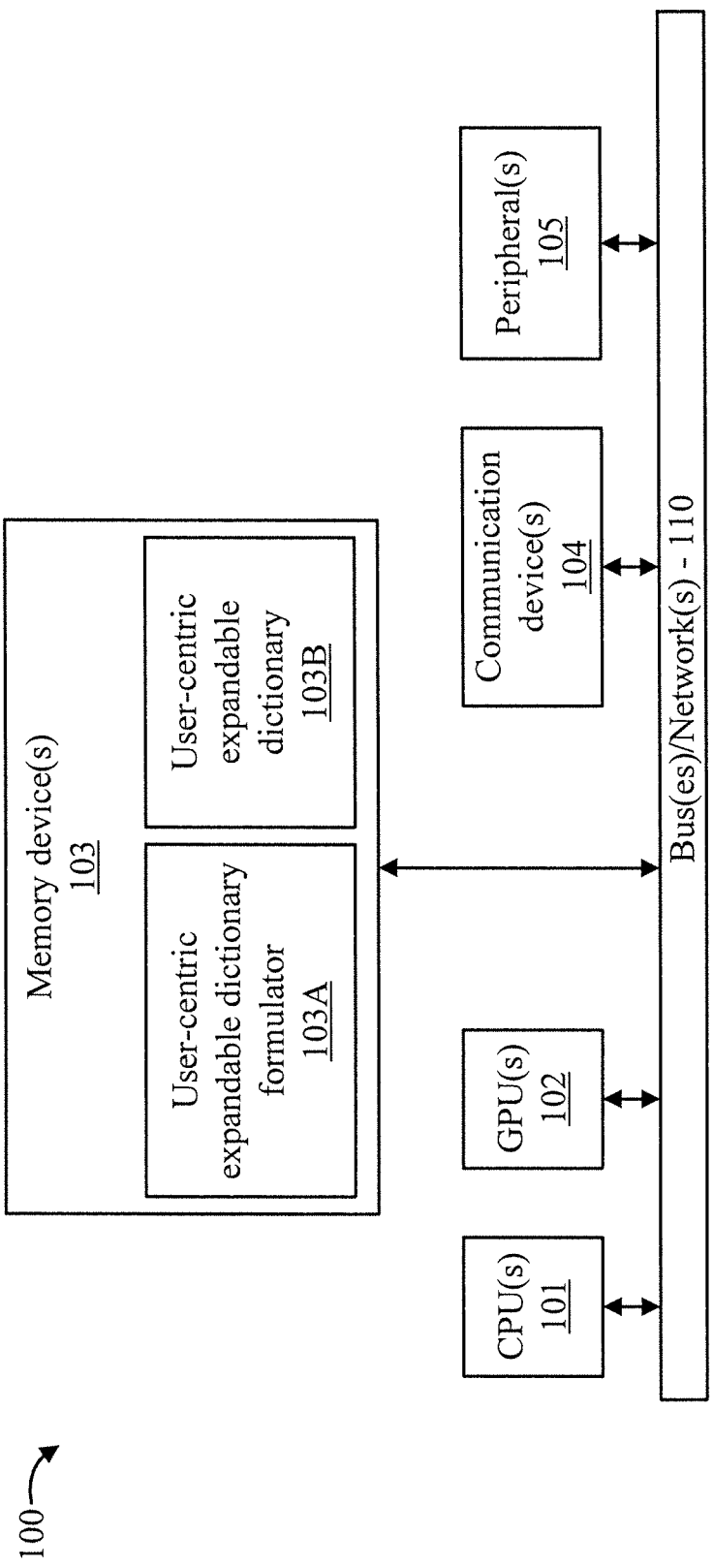
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 can include a user-centric dictionary formulator 103A for forming a user-centric expandable dictionary 103B. In an embodiment, the user-centric dictionary formulator 103A includes a feature selection model and a feature weighting model.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 4-5). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
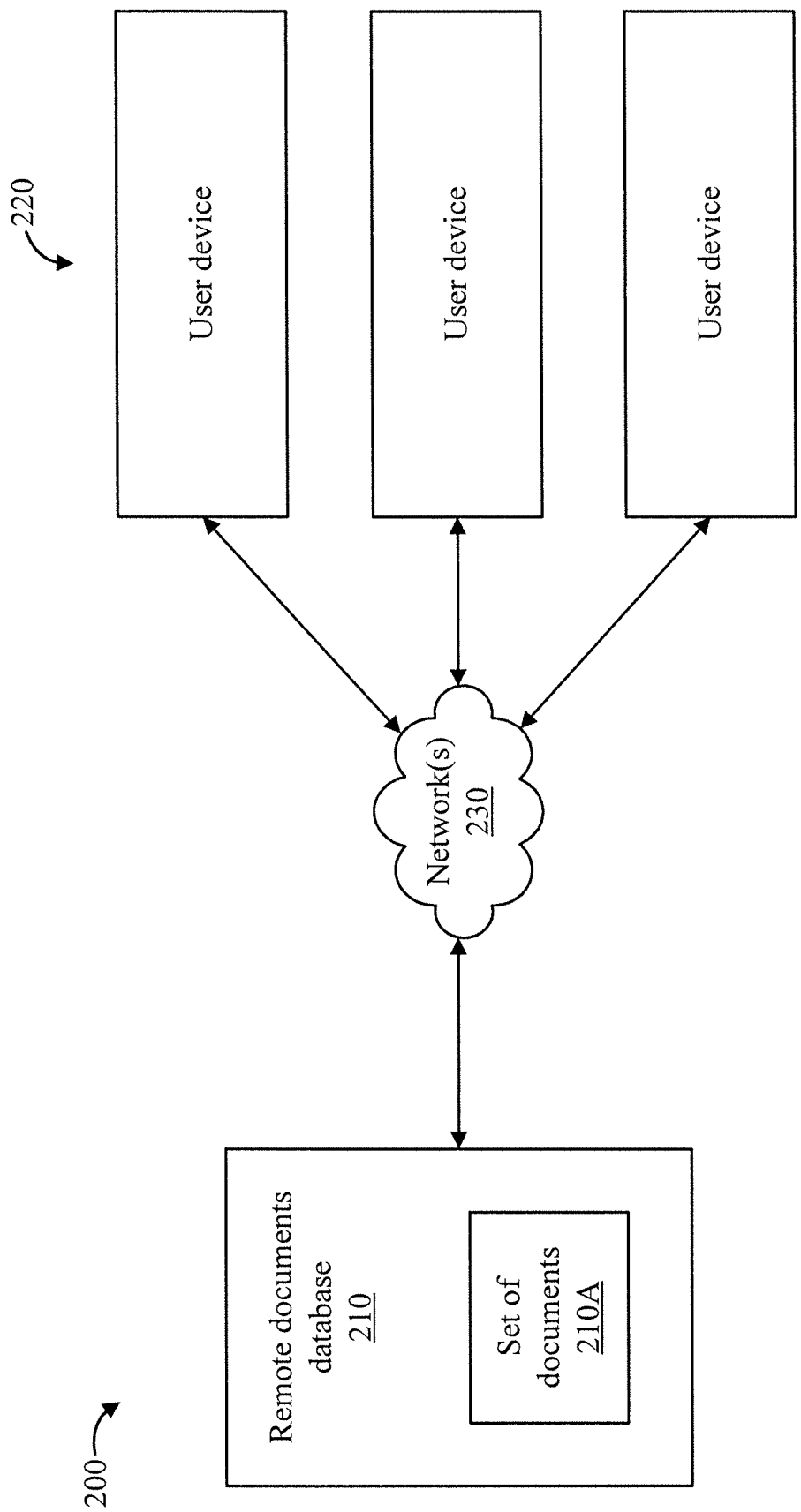
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a remote document database 210 and a set of user devices 220. The set of user devices 220 can access the remote document database 210 over one or more networks 230. Each of the set of user devices 220 can be configured similar to computer processing system 100 of FIG. 1 or can be implemented by a different device (e.g., a mobile phone, a tablet, etc.).

The remote document database 210 includes a set of documents 210A. The set of documents 210A can be used to form user-centric dictionaries. To that end, the documents 210A can be directed to different domains that potentially relate to different subjects of interest to a set of users so that each user can build their own user-centric dictionary from corresponding ones of the documents 210A. In an embodiment, the remote document database 210 is filled from documents obtained from the Internet or from one or more document repositories that can include, for example, but not limited to, education databases, new sources, and so forth.

Figure 3:
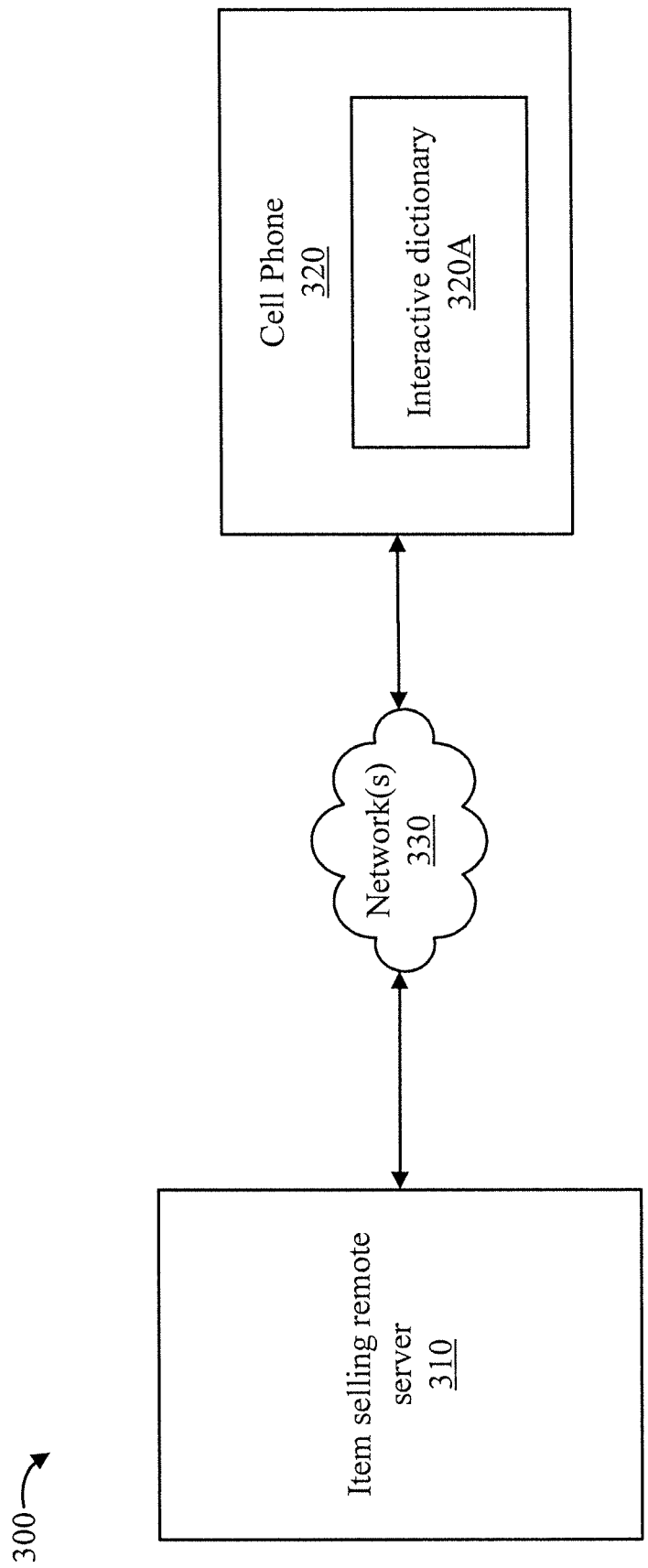
FIG. 3 is a block diagram showing an exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes an item selling remote server 310 for selling various items over the Internet. The environment further includes a cell phone 320 having an interactive dictionary 320A. The cell phone 220 can access the item selling remote server 210 over one or more networks 230. The interactive dictionary 320A can be used to identify things of interest to the user that are for sale on the item selling remote server. The user can use the interactive dictionary to find user-centric terms relating to items for sale that are likely of interest to the user due to their inclusion in the interactive dictionary. In an embodiment, newly added words relative to the original release can be flagged to be of particular interest to the user due to their inclusion in the dictionary based on user actions. In this way, a user can use, for example, a domain specific (legal, medical, etc.) enhanced dictionary to obtain specialty items.

Figure 4:
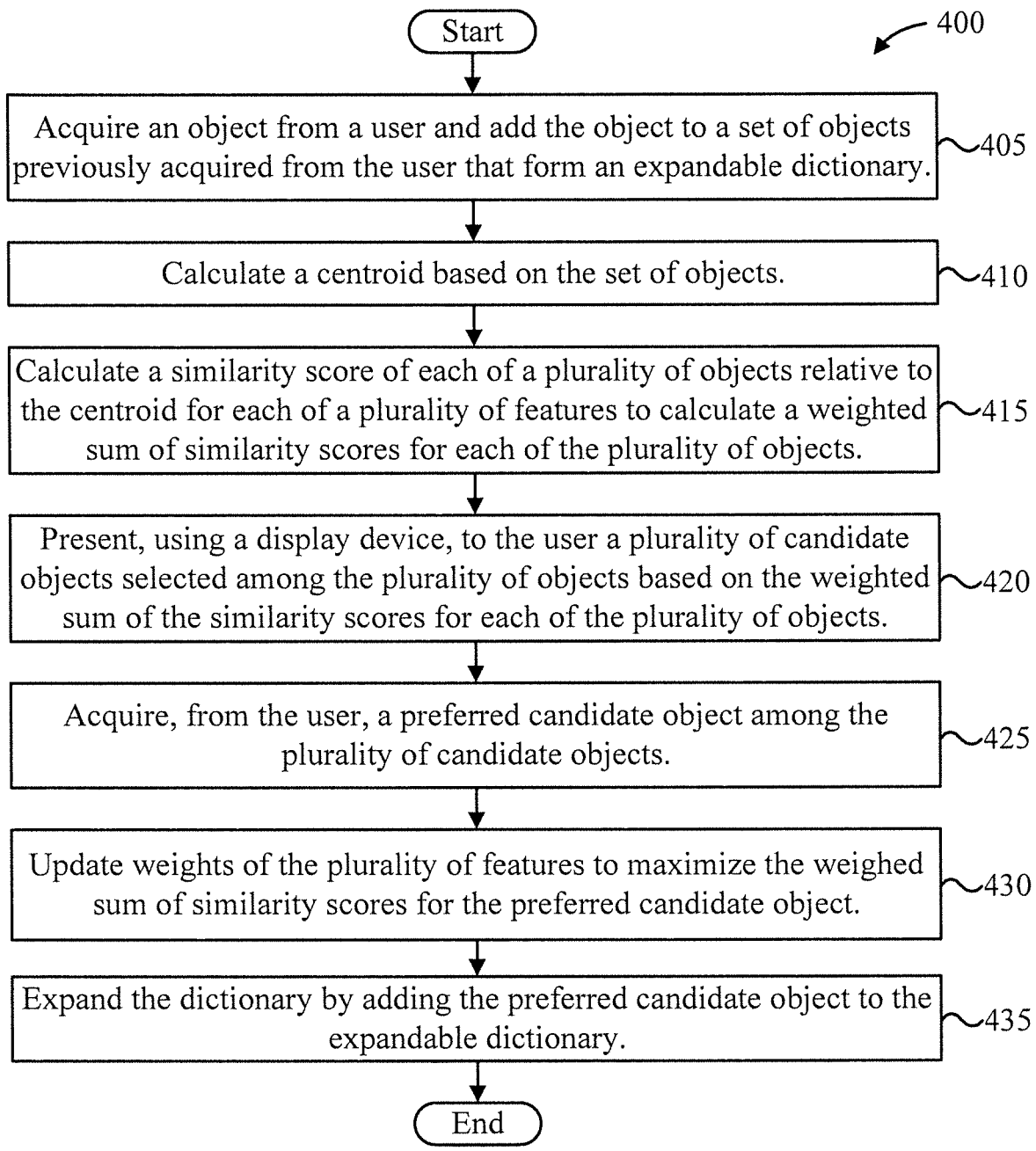
FIG. 4 is a flow diagram showing an exemplary method for user-centric interactive dictionary expansion, in accordance with an embodiment of the present invention.

FIG. 4 is a flow diagram showing an exemplary method 400 for user-centric interactive dictionary expansion, in accordance with an embodiment of the present invention.

At block 405, acquire an object (e.g., a word) from a user and add the object to a set of objects (e.g., other words) previously acquired from the user that form an expandable dictionary. In an embodiment, the set of objects includes seed words.

At block 410, calculate a centroid based on the set of objects. In an embodiment, the centroid is calculated by averaging vectors relating to all of the objects in the set previously provided as the part of user-intended dictionary.

At block 415, calculate a similarity score of each of a plurality of objects (e.g., yet other words) relative to the centroid for each of a plurality of object features to calculate a weighted sum of similarity scores for each of the plurality of objects. In an embodiment, block 415 can involve selecting, as the plurality of features, Q features which maximize a pair-wise similarity, where Q is an integer. In an embodiment, exemplary object features include part of speech (noun, verb, etc.), distributions of surrounding words (at left position, at right position, etc.), and dependency information (subject, object, etc.). In an embodiment, a feature selection model can be used to determine the features. In an embodiment, a feature weighting model can be used to weight the features. Further descriptions of the feature selection model and the feature weighting model are provided hereinbelow. The feature selection model and the feature weighting model can be part of a dictionary formulator 103A as shown in FIG. 1.

At block 420, present, using a display device, to the user a plurality of candidate objects selected among the plurality of objects based on the weighted sum of the similarity scores for each of the plurality of objects. The plurality of candidate objects can be determined as the top-n similar terms to the averaged vector of terms in the set of objects. The plurality of candidates are thus determined relative to the centroid of the set of objects and not a particular object in the set.

At block 425, acquire, from the user, a preferred candidate object among the plurality of candidate objects. The preferred candidate object can be the one with the highest weighted sum of the similarity scores from among the plurality of candidate objects.

At block 430, update weights of the plurality of features to maximize the weighed sum of similarity scores for the preferred candidate object. In an embodiment, the weights of the plurality of features are updated using a minimax approach such that the minimum score in U is maximized to keep the candidates divergent. That is the minimax approach minimizes the possible loss for the worst case (maximum loss) scenario.

At block 435, expand the dictionary by adding the preferred candidate object to the expandable dictionary. In this way, a user-centric interactive dictionary expansion is achieved.

A further description will now be given regarding a feature selection model and a feature weighting model that can be used in method 400 of FIG. 4, in accordance with one or more embodiments of the present invention.

The feature selection model is used to select features to make feedbacked terms closer to the centroid. The optimal feature selection that makes feedbacked terms closest to each other is difficult due to the exponential combinations of features. The feature weighting model is used to make feedbacked terms closer to the centroid. The optimal weighting that makes feedbacked terms closest to each other can be solvable analytically thanks to the convex nature of the formula.

The following notations apply:
$e_i$ denotes a term;
s denotes a seed term;
L denotes a number of features;
$w_k$ denotes a weight for a k-th feature;
$v_{fk(e)}$ denotes a vector of e with the function $f_k$;
U denotes a set of user selected terms, s ∈ U;
U' denotes a set of user selected terms except for seed terms, U':={x|x∈ U, x≠s}.

Regarding the feature selection model, the following can apply:

$$Sim(e_i, e_j|F) = \text{Jaccard Coef}(e_i, e_j|F)$$

$$F^* = \underset{|F|=Q}{\operatorname{argmax}} \sum_{1 \leq i \leq j \leq n} Sim(e_i, e_j|F),$$

where U:={$e_1, e_2, \ldots, e_n$}, F is a set of features, and Q is a fixed number.

The similarity function uses a Jaccard coefficient with a given feature set. Of course, other similarity function/metric can also be used.

The motivation is to select Q features (subset features F* of all features F) which maximize a pair-wise similarity of user selected terms U.

Regarding the feature weighting model, the following can apply:

$$Sim(e_i, U) = \sum_{k=1}^{L} w_k \cdot v_{fk}(e_i) \cdot v_{fk}(U)$$

$$w^* = \operatorname{argmax} Sim(e_i, U|w)$$

$$\text{s.t. centroid vector } v_{fk}(U) := \frac{1}{n} \sum_{L \in W} v_{fk}(e),$$

wherein n denotes the number of user selected terms.

The condition for norm of any vector is as follows: $\|v_{fk}(e_i)\|=1$.

Hence, the score used in the candidate selection and model optimization by $Sim(e_i, U)$ is not on a certain seed term s but on a centroid vector $v_{fk}(U)$.

The centroid vector is an averaged vectors of all user selected terms in U.

There is a condition in which a norm of any vector is normalized to 1, as shown above.

The candidate selection selects the top-n similar terms to the averaged vector of terms in U.

The model optimization updates $w_k$ to increase the pair-wised similarity scores of terms in U. The formulation herein proves that $w_k$ can achieve an optimal solution to maximize the pair-wised scores.

High pair-wised scores intuitively indicate that all terms in U get higher similarity with respect to each other, which is totally ideal for this user-centric dictionary expansion.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
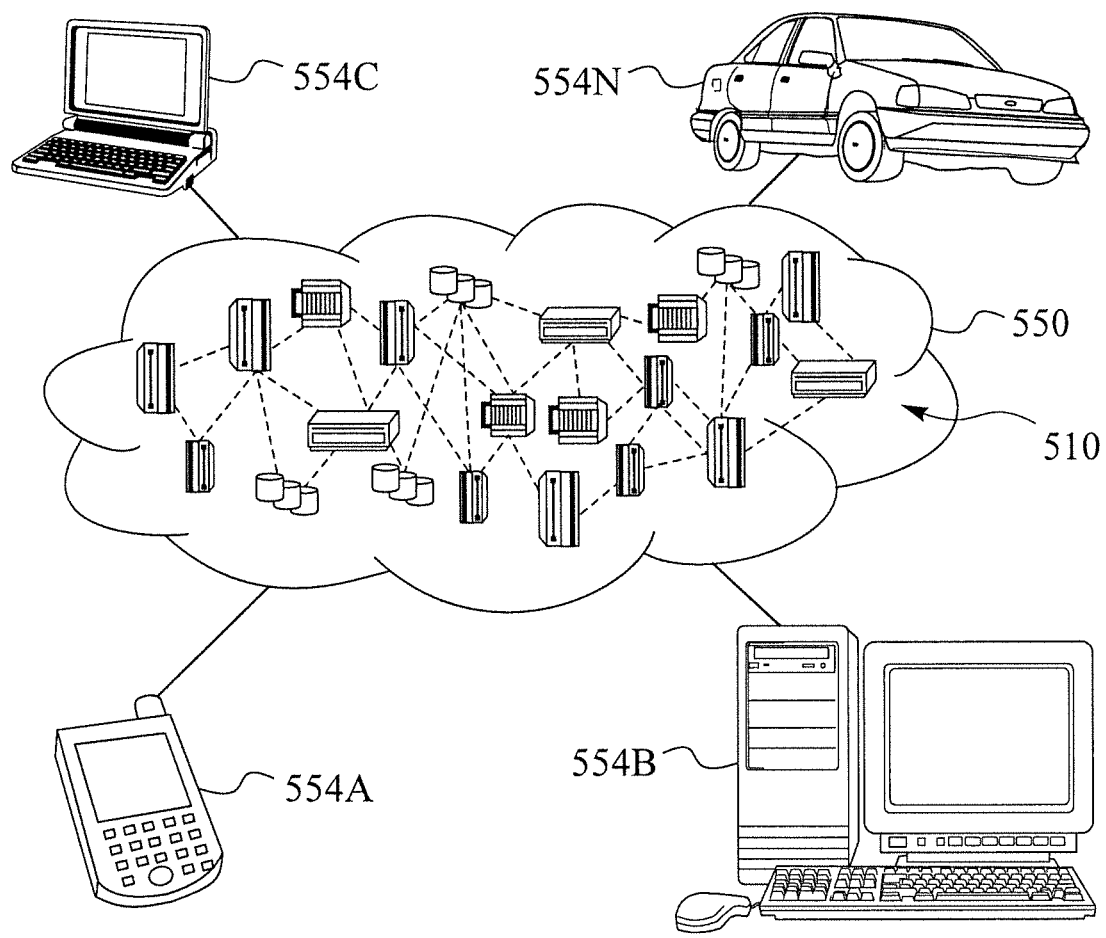
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 450 can communicate with any type of computerized device over any type of network and/or network addressable connection (e.g., using a web browser).

Figure 6:
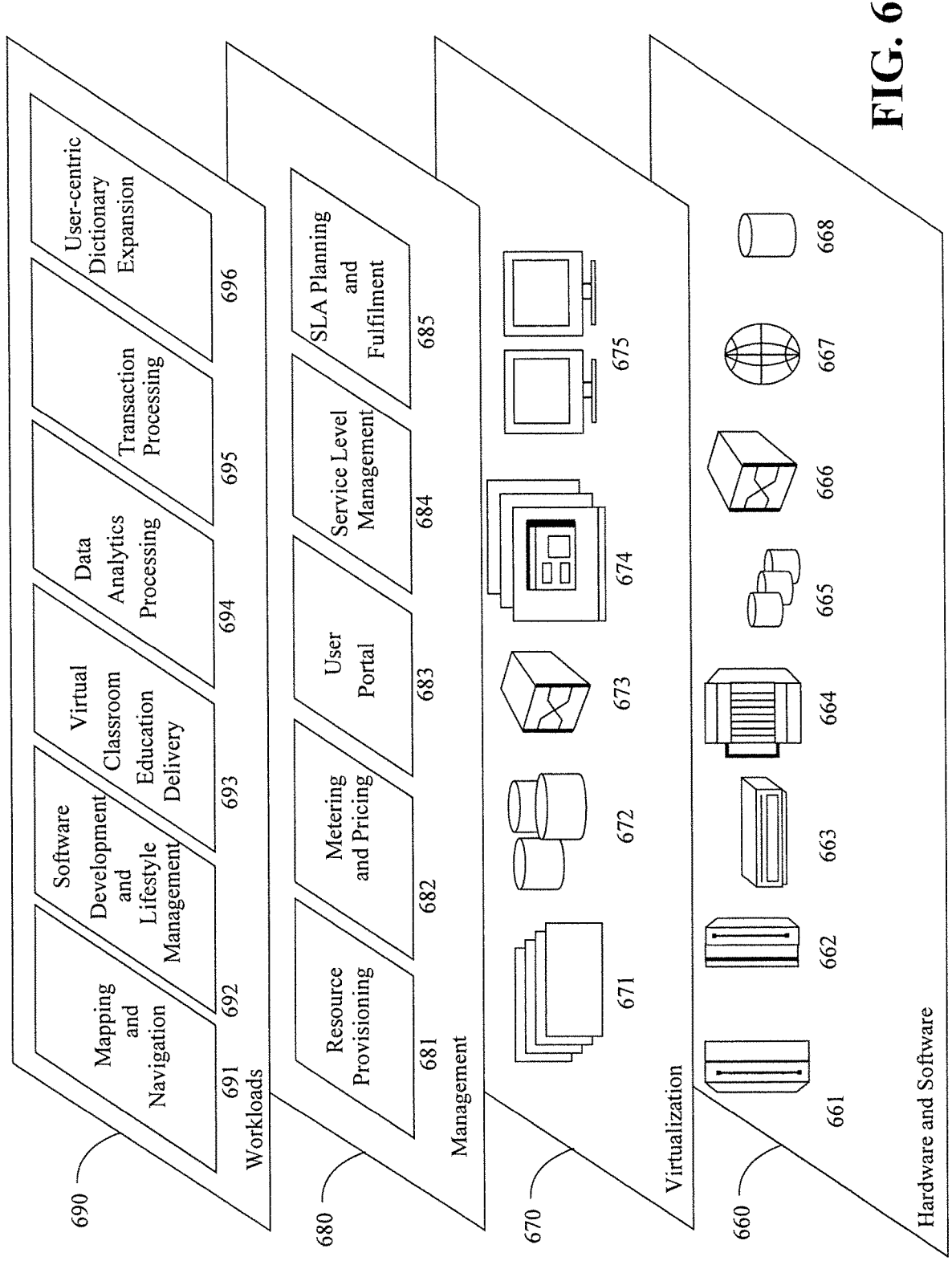
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 584 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and user-centric dictionary expansion 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for user-centric interactive electronic dictionary expansion, comprising:

acquiring, by a memory-based user-centric expandable dictionary formulator comprised in a memory device of a cellular phone, an object from a user and adding the object to a set of objects previously acquired from the user that form a user-centric interactive expandable electronic dictionary of word definitions as part of the memory device of the cellular phone;

calculating a centroid based on the set of objects acquired from the user;

calculating a similarity score of each of a plurality of objects extracted from an item selling remote server relative to the centroid for each of a plurality of object features to calculate a weighted sum of similarity scores for each of the plurality of objects using a feature weighting model which makes the set of objects previously acquired from the user closer to the centroid by multiplying a feature weight for a given one of the plurality of object features by an object vector corresponding to a given one of the plurality of objects and by a set vector corresponding to the set of objects previously acquired from the user;

presenting, using a display device of the cellular phone, to the user a plurality of candidate objects selected among the plurality of objects based on the weighted sum of the similarity scores for each of the plurality of objects;

acquiring, from the user, a preferred candidate object among the plurality of candidate objects;

updating weights of the plurality of features to maximize the weighed sum of similarity scores for the preferred candidate object; and expanding, by the memory-based user-centric expandable dictionary formulator, the user centric interactive expandable electronic dictionary by adding the preferred candidate object to the user centric interactive expandable electronic dictionary of word definitions.

2. The computer-implemented method of claim 1, wherein said step of calculating the similarity score of each of the plurality of objects comprises selecting, as the plurality of features, Q features which maximize a pair-wise similarity, where Q is an integer.

3. The computer-implemented method of claim 1, wherein the set of objects comprise seed words.

4. The computer-implemented method of claim 1, wherein the weighted sum of the similarity scores for each of the plurality of objects is weighted based on feature similarity between each of the plurality of objects and the centroid.

5. The computer-implemented method of claim 1, wherein the preferred candidate object is acquired from among the plurality of candidate objects based on having a highest value of the weighted sum of similarity scores for each of the plurality of objects.

6. The computer-implemented method of claim 1, wherein the plurality of objects are words comprised in a document corpus.

7. The computer-implemented method of claim 1, wherein the weights of the plurality of features are updated in a minimax manner such that a minimum score in a set of user selected terms is maximized to keep the candidates divergent.

8. The computer-implemented method of claim 1, wherein the centroid is formed by averaging vectors relating to all of the objects in the set.

9. A computer program product for user-centric interactive electronic dictionary expansion, the computer program product comprising a non-transitory computer readable storage medium having program instructions embodied therewith, the program instructions executable by a computer to cause the computer in a cellular phone to perform a method comprising:

acquiring, by a memory-based user-centric expandable dictionary formulator comprised in a memory device of the cellular phone an object from a user and adding the object to a set of objects previously acquired from the user that form a user centric interactive expandable electronic dictionary of word definitions as part of the memory device of the cellular phone;

calculating a centroid based on the set of objects acquired from the user;

calculating a similarity score of each of a plurality of objects extracted from an item selling remote server relative to the centroid for each of a plurality of object features to calculate a weighted sum of similarity scores for each of the plurality of objects using a feature weighting model which makes the set of objects previously acquired from the user closer to the centroid by multiplying a feature weight for a given one of the plurality of object features by an object vector corresponding to a given one of the plurality of objects and by a set vector corresponding to the set of objects previously acquired from the user;

presenting, using a display device of the cellular phone, to the user a plurality of candidate objects selected among the plurality of objects based on the weighted sum of the similarity scores for each of the plurality of objects;

acquiring, from the user, a preferred candidate object among the plurality of candidate objects;

updating weights of the plurality of features to maximize the weighed sum of similarity scores for the preferred candidate object; and expanding, by the memory-based user-centric expandable dictionary formulator, the user centric interactive expandable electronic dictionary by adding the preferred candidate object to the user centric interactive expandable electronic dictionary of word definitions.

10. The computer program product of claim 9, wherein said step of calculating the similarity score of each of the plurality of objects comprises selecting, as the plurality of features, Q features which maximize a pair-wise similarity, where Q is an integer.

11. The computer program product of claim 9, wherein the set of objects comprise seed words.

12. The computer program product of claim 9, wherein the weighted sum of the similarity scores for each of the plurality of objects is weighted based on feature similarity between each of the plurality of objects and the centroid.

13. The computer program product of claim 9, wherein the preferred candidate object is acquired from among the plurality of candidate objects based on having a highest value of the weighted sum of similarity scores for each of the plurality of objects.

14. The computer program product of claim 9, wherein the plurality of objects are words comprised in a document corpus.

15. The computer program product of claim 9, wherein the weights of the plurality of features are updated in a minimax manner such that a minimum score in a set of user selected terms is maximized to keep the candidates divergent.

16. The computer program product of claim 9, wherein the centroid is formed by averaging vectors relating to all of the objects in the set.

17. A cellular phone for user-centric interactive electronic dictionary expansion, comprising:

a memory device comprising a user-centric expandable dictionary formulator and a user centric interactive expandable electronic dictionary of word definitions, the user-centric expandable dictionary formulator including program code stored thereon;

a hardware processor, operatively coupled to the memory device, and configured to run the program code to acquire an object from a user and adding the object to a set of objects previously acquired from the user that form the user centric interactive expandable electronic dictionary;

calculate a centroid based on the set of objects acquired from the user;

calculate a similarity score of each of a plurality of objects extracted from an item selling remote server relative to the centroid for each of a plurality of object features to calculate a weighted sum of similarity scores for each of the plurality of objects using a feature weighting model which makes the set of objects previously acquired from the user closer to the centroid by multiplying a feature weight for a given one of the plurality of object features by an object vector corresponding to a given one of the plurality of objects and by a set vector corresponding to the set of objects previously acquired from the user;

present, using a display device, to the user a plurality of candidate objects selected among the plurality of objects based on the weighted sum of the similarity scores for each of the plurality of objects;

acquire, from the user, a preferred candidate object among the plurality of candidate objects;

update weights of the plurality of features to maximize the weighed sum of similarity scores for the preferred candidate object; and expand the user-centric expandable electronic dictionary by adding the preferred candidate object to the user-centric expandable electronic dictionary of word definitions.

18. The computer processing system of claim 17, wherein said step of calculating the similarity score of each of the plurality of objects comprises selecting, as the plurality of features, Q features which maximize a pair-wise similarity, where Q is an integer.

19. The computer processing system of claim 17, wherein the set of objects comprise seed words.

20. The computer processing system of claim 17, wherein the weighted sum of the similarity scores for each of the plurality of objects is weighted based on feature similarity between each of the plurality of objects and the centroid.

* * * * *